US007626287B2

(12) United States Patent
Sanders

(10) Patent No.: US 7,626,287 B2
(45) Date of Patent: Dec. 1, 2009

(54) HIGH VOLTAGE LOADBREAK SWITCH SAFETY INDICATOR

(76) Inventor: Dean Sanders, 5388 Ryburn Way, Linden, CA (US) 95236

( * ) Notice: Subject to any disclaimer, the term of this patent is extended or adjusted under 35 U.S.C. 154(b) by 0 days.

(21) Appl. No.: 11/099,945

(22) Filed: Apr. 6, 2005

(65) Prior Publication Data

US 2007/0039928 A1 Feb. 22, 2007

(51) Int. Cl.
*G06F 13/40* (2006.01)

(52) U.S. Cl. ...................................................... 307/134

(58) Field of Classification Search .................. 307/134
See application file for complete search history.

(56) References Cited

U.S. PATENT DOCUMENTS 4,806,925 A * 2/1989 Simard et al. .......... 340/815.84
5,874,900 A * 2/1999 Panto ......................... 340/644

* cited by examiner

*Primary Examiner*—Robert L. Deberadinis
(74) *Attorney, Agent, or Firm*—Matlock Law Group, PC; K. Brian Matlock

(57) ABSTRACT

A loadbreak, switch safety device mechanism, which provides easily visible, positive alignment and engagement of high-voltage switch loadbreak actuating and trip arms. The apparatus can be easily adapted to various types of high-voltage loadbreak designs. The apparatus is comprised of a new high-voltage loadbreak switch interrupter safety flag, constructed of a molded, rotatable arm about a pivot axis.

5 Claims, 2 Drawing Sheets

HIGH VOLTAGE LOADBREAK SWITCH SAFETY INDICATOR

BACKGROUND

1. Field of the Disclosure

The present invention relates to high-voltage, overhead, non-enclosed electric switches. More particularly, the present invention a safety device which indicates the switch is properly closed. It is necessary for the switch to be properly closed in order to safely operate the switch to open. If the switch is not properly closed the loadbreak interrupter will not interrupt the high-voltage circuit which can cause damage to the switch, injure personnel operating the switch, and ignite fires.

2. The Prior Art

Background

High voltage loadbreak circuit interrupter safety devices are known in the art. One known type of visual safety indicating device of a closed loadbreak switch is a highly visible plastic cover bonded over interrupter actuating arm. The plastic cover is designed to provide visual indication of a properly closed switch. The plastic covered actuating arm does increase the visibility of the actuating arm, but does not increase the visibility of the interrupter trip arm, or the actuating and trip arm alignment. The interrupter trip arm must pass by the interrupter actuating arm and be properly aligned upon switch closure for proper circuit interruption when the switch is actuated to open. The plastic covered interrupter actuating arm does not provide positive indication that the switch is properly closed.

Another kind of known loadbreak interrupter safety indicator is a device which is mounted to the rotating shaft which connects the loadbreak device to the interrupter actuating arm. This device indicates that the loadbreak internal mechanism has been reset to its properly closed position, but does not indicate that the interrupter trip arm and actuating arms are properly aligned to actuate the interrupter upon switch opening operations.

BRIEF DESCRIPTION OF THE DRAWING FIGURES

DETAILED DESCRIPTION

Figure 1A:
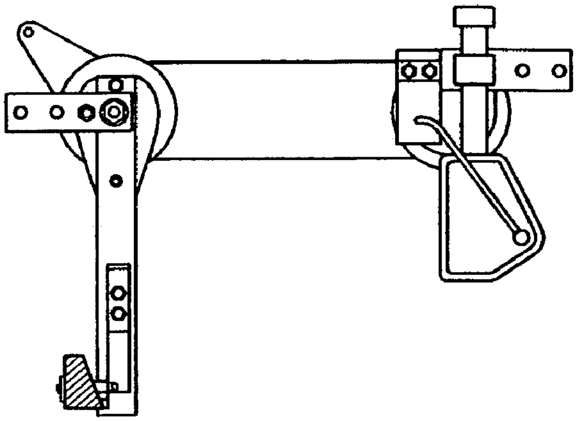
FIG. 1 is a load break interrupter safety indicator with contact blade in the vertical position.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

Accordingly, it is a primary object of the present invention to provide a high-voltage loadbreak switch safety device which provides easily visible positive alignment and engagement of the high-voltage switch loadbreak actuating and trip arms.

It is yet another object of this invention to provide a means to allow the interrupter safety flag to be utilized in any construction method commonly employed of high-voltage loadbreak switches.

It is yet another object of this invention that it can be easily adapted to various types of high-voltage loadbreak switch designs.

To attain these objects, the present invention discloses a new high-voltage loadbreak switch interrupter safety device. The safety device of the present invention comprises a non-metallic shape that is held to the loadbreak switch interrupter trip arm at a specific location and orientation. The interrupter safety device is caused to rotate to a secondary position only when the high-voltage switch loadbreak actuator and trip arms are properly aligned. The visual indication method can be any suitable reflective or illuminating device that can be seen from a distance of at least fifty feet. Suitable indicating means include, but are not limited to, pigments, paints, tape, light emitting diodes, or incandescent lighting devices. Generally these types of visual indicators require a mechanical means to properly orient the visual indicating device to be effected.

According to the teaching of the invention, the loadbreak interrupter safety device is caused to indicate a properly closed loadbreak switch by means of a visual indication of the alignment of an interrupter trip arm fastened to a movable switch contact which is fastened to a rotating insulator which is caused to move by any suitable means, and a mating interrupter actuating arm component comprised within the high voltage loadbreak device.

FIG. 1 is a load break interrupter safety indicator with contact blade in the vertical position.

By interlocking the loadbreak interrupter safety indicator device with the contact blade in the vertical position, a positive indication of the interrupter trip arm in the closed position is possible.

FIG. 1A is a load break interrupter safety indicator with contact blade in the vertical position.

Figure 1B:
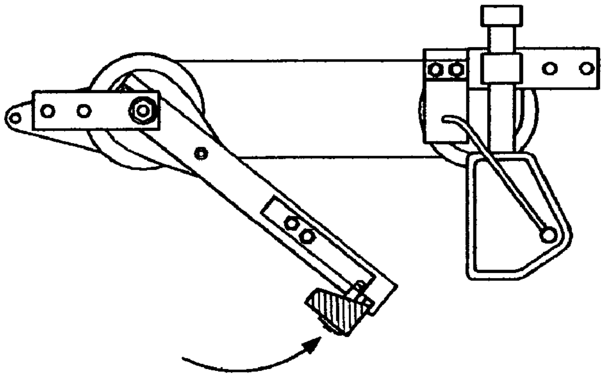

FIG. 1B is the load break interrupter safety indicator with contact blade rotating about a horizontal plane from the vertical position in the counter-clockwise direction.

Figure 1C:
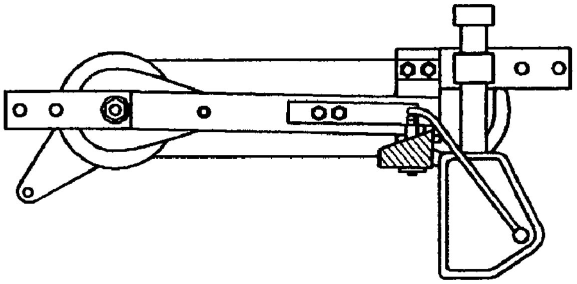

FIG. 1C is the load break interrupter safety indicator with contact blade in the horizontal closed position with the safety flag in the visible orientation.

Figure 1D:
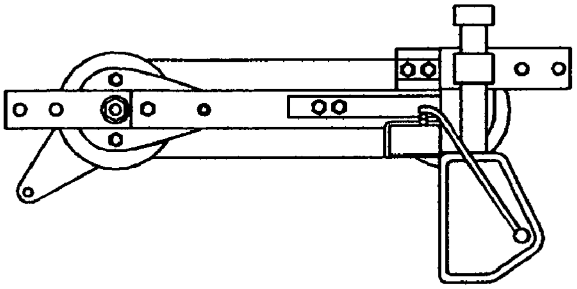

FIG. 1D is the load break interrupter safety indicator with contact blade in the horizontal and now fully engaged position with the safety flag not visible.

Figure 1E:
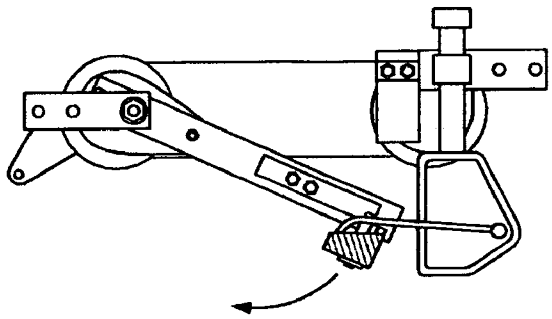

FIG. 1E is the load break interrupter safety indicator with contact blade rotating from the horizontal position to the vertical position and also re-positioning the safety indicator flag.

Figure 2:
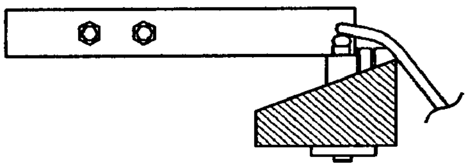
FIG. 2 is a load break interrupter safety indicator with contact blade operated towards the closed switch position.

FIG. 2 is a load break interrupter safety indicator with contact blade operated towards the closed switch position.

FIG. 2 is one embodiment of the high voltage loadbreak interrupter safety device providing visual safety indication of the proper operation of a loadbreak contact blade and trip arm. In this embodiment, a reflective indicator caution device traverses axially with the contact blade and rotates about an axis perpendicular to the contact blade providing positive safety indication where the indicator device is not visible.

Figure 3:
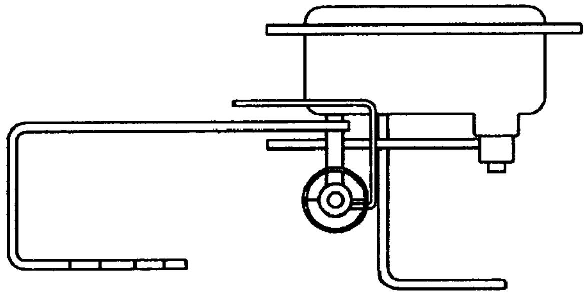
FIG. 3 is a load break interrupter safety indicator with contact blade closed improperly.

FIG. 3 is a load break interrupter safety indicator with contact blade closed improperly.

FIG. 3 shows an improperly closed contact blade. A visible indicator safety caution device, unactuated, not rotated about the perpendicular axis to the contact blade, indicates an improperly closed switch position leading to potentially dangerous low level to ground and short circuit currents. An improperly closed switch has not passed by the interrupter trip arm and has not caused the safety indicator device to actuate. In this embodiment to rotate about the contact blade axis.

Figure 4:
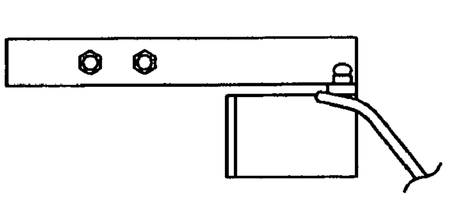
FIG. 4 is a load break interrupter where the contact blade has rotated and the reflective caution device is not seen indicating a properly closed contact blade.

FIG. 4 is a load break interrupter where the contact blade has rotated and the reflective caution flag is not seen indicating a properly closed contact blade.

FIG. 4 shows one embodiment of the invention, a properly actuated safety indicator caution device where the reflective caution warning is not visible thereby indicating that the high voltage loadbreak interrupter switch is properly in the closed position. When the safety indicator reflective caution device is not visible, the indicator device has rotated axially about a transverse axis about the lengthwise centerpoint of the contact blade. In this embodiment, proper operation of the safety indicator device will rotate downward by the parallel fastening panel attached through a hinged pin and spring mechanism. When the contact blade properly closes, the spring is actuated, releasing the safety device mechanism to operate by rotating ninety degrees downward. In the actuated position the safety device is facing downward, parallel to the equipment pad and not visible to the switch operator, thereby indicating that the switch is properly in the closed position.

Figure 5:
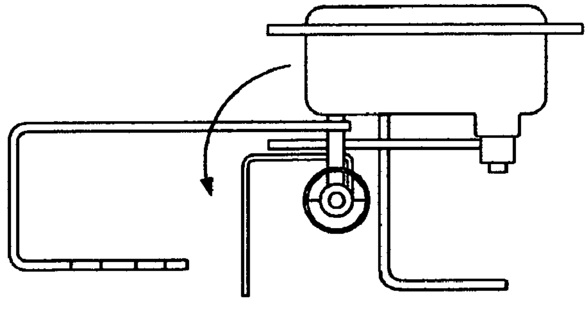
FIG. 5 is a load break interrupter where the opening switch is depicting the proper trip arm and actuating arm engagement.

FIG. 5 is a load break interrupter where the opening switch is depicting the proper trip arm and actuating arm engagement.

FIG. 5 depicts one embodiment where a properly operating contact blade which the reflective safety caution indicator device has been actuated and rotated downward. Upon the movement of the contact blade to the open position, the safety indicator device will reset to the visible position once more. Thus, in this embodiment, the safety indicator device will transverse axially with the contact blade that rotates about a pivot point centered at the power conductor connection. A switch operator will visibly detect the caution indicator device should the contact blade not properly engage and appropriate troubleshooting can occur.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A High Voltage Loadbreak Switch Safety Indicator apparatus comprising:

a switch safety indication device wherein proper contact blade closure is positively displayed and wherein said switch safety indication device is a reflective caution warning device that rotates to indicate visible positive contact alignment.

2. The apparatus of claim 1 further comprising:

a means for high voltage loadbreak switch safety indication.

3. The apparatus of claim 2 wherein said high voltage loadbreak switch safety indication means is a flag constructed from a material selected from the group consisting of a metal material, a composite material, and a thermoplastic material.

4. The apparatus of claim 2 wherein a front, side and rear safety indicator device is formed of front, side, rear and secondary front facing panels; pivotally attached to a right angle pin, fastened and clasped to a formed, spring assembly; wherein said formed safety indicator device includes cut edges and contoured, curvature attaching edges comprising a front panel including a reflective, adhesive backed front panel and a cylindrical cavity about a vertical axis and wherein said formed safety indicator device is slidingly attached to a right angle pin and a formed, spring assembly wherein the safety indicator device is not visible when the device is indicating that a high voltage loadbreak interrupter switch is properly in the closed position.

5. A method for indicating high voltage switch safety, comprising the steps of:

indicating proper contact blade positioning, preventing improper contact blade positioning, and facilitating proper trip arm and actuator arm engagement.

* * * * *